US007565526B1

(12) United States Patent
Shaw et al.

(10) Patent No.: US 7,565,526 B1
(45) Date of Patent: Jul. 21, 2009

(54) THREE COMPONENT SECURE TUNNEL

(75) Inventors: Andrew Shaw, Liversedge (GB); Michael Thomas McEwen, Leeds (GB); Karl Richard Burgess, Harrogate (GB)

(73) Assignee: Sun Microsystems, Inc., Santa Clara, CA (US)

( * ) Notice: Subject to any disclaimer, the term of this patent is extended or adjusted under 35 U.S.C. 154(b) by 892 days.

(21) Appl. No.: 11/050,097

(22) Filed: Feb. 3, 2005

(51) Int. Cl.
*H04L 9/00* (2006.01)
(52) U.S. Cl. .......................................... 713/150; 726/15
(58) Field of Classification Search ................. 370/351; 713/171, 178, 201, 150, 189; 726/3, 12, 726/15
See application file for complete search history.

(56) References Cited

U.S. PATENT DOCUMENTS

| | | | |
|---|---|---|---|
| 6,061,797 | A | 5/2000 | Jade et al. |
| 6,104,716 | A | 8/2000 | Crichton et al. |
| 6,367,009 | B1 | 4/2002 | Davis et al. |
| 6,584,567 | B1 * | 6/2003 | Bellwood et al. ........... 713/171 |
| 6,915,436 | B1 * | 7/2005 | Booth et al. ..................... 726/3 |
| 6,996,841 | B2 * | 2/2006 | Kadyk et al. ................... 726/12 |
| 7,107,464 | B2 * | 9/2006 | Shapira et al. ................ 726/15 |
| 7,191,341 | B2 * | 3/2007 | Paaske et al. ................ 713/189 |
| 2002/0075844 | A1 * | 6/2002 | Hagen ........................ 370/351 |
| 2003/0046586 | A1 | 3/2003 | Bheemarasetti et al. |
| 2003/0163704 | A1 * | 8/2003 | Dick et al. ................... 713/178 |
| 2004/0039827 | A1 | 2/2004 | Thomas et al. |
| 2004/0250059 | A1 * | 12/2004 | Ramelson et al. ........... 713/150 |
| 2004/0268148 | A1 * | 12/2004 | Karjala et al. ............... 713/201 |
| 2005/0091540 | A1 * | 4/2005 | Dick et al. .................. 713/201 |

FOREIGN PATENT DOCUMENTS

EP         1 081 918 A2       3/2003

OTHER PUBLICATIONS

Ann-Tzung Cheng; Secure Transparent Mobile IP for Intelligent Transportation Systems; Year: 2004; IEEE; pp. 1-6.*

"The SSL Protocol Version 3.0" Nov. 18, 1996; Alan O. Freier, Philip Karlton and Paul C. Kocher; Transport Layer Security Working Group.

(Continued)

*Primary Examiner*—Kambiz Zand
*Assistant Examiner*—Monjour Rahim
(74) *Attorney, Agent, or Firm*—Osha • Liang LLP

(57) ABSTRACT

Systems and methods are described for a secure tunnel. A method includes establishing a first connection ($C_{IO}$) from an inner agent to an outer agent including making a first TCP connection from the inner agent to the outer agent, negotiating a first SSL/TLS session ($SSLSession_{IO}$) between the inner agent and the outer agent over the first TCP connection and applying the first SSL/TLS session ($SSLSession_{IO}$) between the inner agent and the outer agent over the first TCP connection; establishing a second connection ($C_{CO}$) from a client to the outer agent including making a second TCP connection from the client to the outer agent, negotiating a second SSL/TLS session ($SSLSession_{CO}$) between the client and the outer agent over the second TCP connection and applying the second SSL/TLS session ($SSLSession_{CO}$) between the client and the outer agent over the second TCP connection; and then negotiating a third SSL/TLS session ($SSLSession_{CI}$) between the client and the inner agent via both the first SSL/TLS session ($SSLSession_{IO}$) and the second SSL/TLS session ($SSLSession_{CO}$) and applying the third SSL/TLS session ($SSLSession_{CI}$) between the client and the inner agent layered over both the first SSL/TLS session ($SSLSession_{IO}$) and the second SSL/TLS session ($SSLSession_{CO}$).

20 Claims, 7 Drawing Sheets

OTHER PUBLICATIONS

"The TLS Protocol Version 1.0" Jan. 1999; T. Dierks and C. Allen, Network Working Group.

"GoToMyPC: Making Life Simpler for Remote and Mobile Workers" 1997-2004; Lisa Phifer; Citrix Systems Inc.

* cited by examiner

THREE COMPONENT SECURE TUNNEL

BACKGROUND INFORMATION

1. Field of the Invention

The invention relates generally to the field of network communications. More particularly, the invention relates to tunneled internet communications. Specifically, embodiments of the invention relate to: systems and methods for a three component secure tunnel; systems and methods for efficient SSL/TSL layering; and systems and methods for authentication of tunneled connections.

2. Discussion of the Related Art (Freier 1996)[1] describes a protocol (SSL) that allows client/server applications to communicate in a way that is designed to prevent eavesdropping, tampering, or message forgery. The SSL protocol is the basis of security on the Internet. However SSL normally requires a direct connection between the client and the server and that means that if the server is behind a firewall then a hole must be opened to allow this access.

(Dierks 1999)[2] describes the Transport Layer Security (TLS) protocol that can provide communications privacy over the internet. TLS is essentially the latest evolution of SSL and suffers the same firewall problem as SSL.

EP 1081918 (Hinde 2003)[3] describes how to create connections using a versatile protocol such as TCP/IP to be established through a firewall and proxy server, the versatile protocol is tunnelled using HTTP. Tunneling connections via http as described by Hinde et al. provides a mechanism that can be used to pass through inspecting firewalls. However it does not provide the security offered by an SSL connection and the implementation of Hinde et al. requires that two connections be used for each tunneled connection.

U.S. Pat. No. 6,104,716 (Critchton et al.) describes a secure lightweight tunneling system for use over the internet. Critchton et al. describes the basic problem presented by firewalls blocking inbound connections and the well-known solution of using a middle server outside of the two firewalls to act as a relay. However it does not address the additional restrictions placed on outbound connections enforced by application level firewalls and packet inspecting firewalls.

Critchon et al. does not use the middle proxy to do authentication and does not throttle and limit unauthenticated connections. This makes the server vulnerable to attacks by unauthenticated clients.

U.S. Pat. Appl. Pub. 2003/0046586 (Bheemarasetti et al.) describes a system for accessing data from any location and any device including those behind firewalls, proxy servers, address translations and other devices, while securing the data and network. The mechanism described by Bheemarasetti et al. provides a secure tunnel mechanism however it requires that the client system can connect to the system running the tunnel software and thus requires that holes be opened in the firewall.

U.S. Pat. No. 6,061,797 (Jade et al.) describes a system that provides a special "tunneling" mechanism, operating on both sides of a firewall, for establishing "outside in" connections when they are requested by certain "trusted" individuals or objects or applications outside the firewall. The solution provided by Jade et al. makes use of outbound connections only and is therefore much more firewall friendly. However the protocols used to establish these connections may not be allowed by packet inspecting firewalls. The mechanism as described requires that the TCP port number of the connections is used to provide access control and routing functions. This implies that different port numbers must be used for different services thus requiring that any firewalls allow outbound connections on these ports. Jade et al. makes use of an "outside server" to act as a relay. This server is typically placed on the public internet. Because no end to end security or integrity is provided a compromised "outside server" could be used to gain access to or alter tunneled data.

(Phifer 2004)[4] describes a mechanism for using a "Communications Server" and a "Broker" server to create a connection between client and server systems located behind firewalls.

This "GoToMyPC" mechanism makes use of outbound connections using the standard SSL on standard ports to communicate with the "broker" system. These connections should have no problem passing through firewalls. However the "Communications server" makes use of a proprietary protocol on a non standard port number and so may be blocked by a firewall.

U.S. Pat. No. 6,367,009 (Davis et al.) describes extending SSL (secure socket layer) to a multi-tier environment using delegation of authentication and authority. The Davis et al. method delegates authentication to the middle tier server. However, this delegation of trust means that the middle tier server can impersonate the client and this is a problem if the middle tier server is compromised.

U.S. Pat. Appl. Pub. 2004/0039827 (Thomas et al.) describes a method a system for providing secure access to private networks with client redirection. The Thomas et al. method requires authentication information on the middle tier or direct access to an authentication database. Also, the Thomas et al. method does not provide a secure tunnel all the way to the back end servers, but instead only to the intermediate server.

SUMMARY OF THE INVENTION

There is a need for the following embodiments of the invention. Of course, the invention is not limited to these embodiments.

According to an embodiment of the invention, a secure tunnel communications method, comprises: establishing a first connection ($C_{IO}$) from an inner agent to an outer agent including making a first TCP connection from the inner agent to the outer agent, negotiating a first SSL/TLS session (SSLSession$_{IO}$) between the inner agent and the outer agent over the first TCP connection and applying the first SSL/TLS session (SSLSession$_{IO}$) between the inner agent and the outer agent over the first TCP connection; establishing a second connection ($C_{CO}$) from a client to the outer agent including making a second TCP connection from the client to the outer agent, negotiating a second SSL/TLS session (SSLSession$_{CO}$) between the client and the outer agent over the second TCP connection and applying the second SSL/TLS session (SSLSession$_{CO}$) between the client and the outer agent over the second TCP connection; and then negotiating a third SSL/TLS session (SSLSession$_{CI}$) between the client and the inner agent via both the first SSL/TLS session (SSLSession$_{IO}$) and the second SSL/TLS session (SSLSession$_{CO}$) and applying the third SSL/TLS session (SSLSession$_{CI}$) between the client and the inner agent layered over both the first SSL/TLS session (SSLSession$_{IO}$) and the second SSL/TLS session (SSLSession$_{CO}$).

According to another embodiment of the invention, a secure tunnel communications method, comprises: establishing a first connection ($C_{IO}$) from an inner agent to an outer agent including making a first TCP connection from the inner agent to the outer agent, negotiating a first SSL/TLS session (SSLSession$_{IO}$) between the inner agent and the outer agent over the first TCP connection and applying the first SSL/TLS session (SSLSession$_{IO}$) between the inner agent and the outer agent over the first TCP connection; establishing a second connection (C$_{CO}$) from a client to the outer agent including making a second TCP connection from the client to the outer agent, negotiating a second SSL/TLS session (SSLSession$_{CO}$) between the client and the outer agent over the second TCP connection and applying the second SSL/TLS session (SSLSession$_{CO}$) between the client and the outer agent over the second TCP connection; then negotiating a third SSL/TLS session (SSLSession$_{CI}$) between the client and the inner agent via both the first SSL/TLS session (SSLSession$_{IO}$) and the second SSL/TLS session (SSLSession$_{CO}$) and applying the third SSL/TLS session (SSLSession$_{CI}$) between the client and the inner agent layered over both the first SSL/TLS session (SSLSession$_{IO}$) and the second SSL/TLS session (SSLSession$_{CO}$); and then ceasing to apply the first SSL/TLS session (SSLSession$_{IO}$) between the inner agent and the outer agent and ceasing to apply the second SSL/TLS session (SSLSession$_{CO}$) between the client and the outer agent.

According to another embodiment of the invention, a secure tunnel communications method, comprises: establishing a first connection (C$_{IO}$) from an inner agent to an outer agent including making a first TCP connection from the inner agent to the outer agent, negotiating a first SSL/TLS session (SSLSession$_{IO}$) between the inner agent and the outer agent over the first TCP connection and applying the first SSL/TLS session (SSLSession$_{IO}$) between the inner agent and the outer agent over the first TCP connection; establishing a second connection (C$_{CO}$) from a client to the outer agent including making a second TCP connection from the client to the outer agent, negotiating a second SSL/TLS session (SSLSession$_{CO}$) between the client and the outer agent over the second TCP connection and applying the second SSL/TLS session (SSLSession$_{CO}$) between the client and the outer agent over the second TCP connection; and then negotiating a third SSL/TLS session (SSLSession$_{CI}$) between the client and the inner agent via both the first SSL/TLS session (SSLSession$_{IO}$) and the second SSL/TLS session (SSLSession$_{CO}$) and applying the third SSL/TLS session (SSLSession$_{CI}$) between the client and the inner agent layered over both the first SSL/TLS session (SSLSession$_{IO}$) and the second SSL/TLS session (SSLSession$_{CO}$), wherein negotiating the second SSL/TLS session (SSLSession$_{CO}$) includes verifying at the outer agent that the client possesses a certificate signed with a certificate associated with the inner agent.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
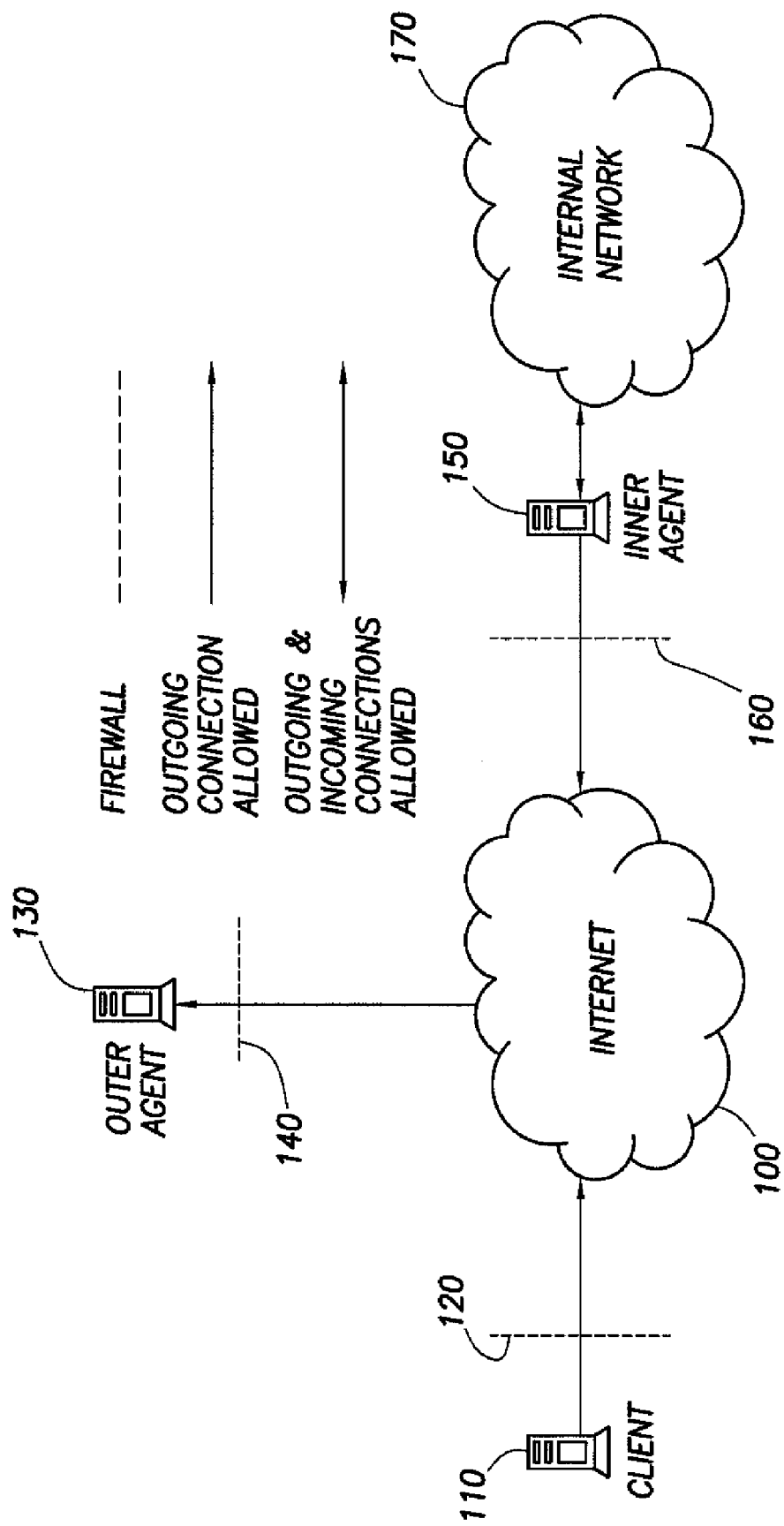
FIG. 1 is a block schematic view of a three component secure tunnel system, representing an embodiment of the invention.

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals, or principal author's name followed by year of publication, within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of embodiments of the invention and illustrating the state of the art.

The below-referenced U.S. Patent(s) and U.S. Patent Application(s) disclose embodiments that are useful for the purposes for which they are intended. The entire contents of U.S. Pat. Nos. 6,104,716; 6,061,797; and 6,367,009 are hereby expressly incorporated by reference herein for all purposes. The entire contents of U.S. Ser. No. 10/410,619, filed Apr. 8, 2003 (Pub. No. U.S. 2004/0039827 A1, published Feb. 26, 2004) and U.S. Ser. No. 10/189,058, filed Jul. 3, 2002 (Pub. No. US 2003/0046586 A1, published Mar. 6, 2003) and are hereby expressly incorporated by reference herein for all purposes. The instant application contains disclosure that is also contained in copending U.S. Ser. No. 11/050,102, attorney docket number TARA1240), filed Feb. 3, 2005; and U.S. Ser. No. 11/050,123, attorney docket number TARA1250), filed Feb. 3, 2005 the entire contents of which are hereby expressly incorporated by reference for all purposes.

Three Component Secure Tunnel

The invention can include a method to create a secure tunnel from clients on one or more networks to an inner agent on another network. The invention can include an outer agent, thereby providing a three component tunnel. The tunnel can to be used to pass arbitrary data through firewalls and to access internal services on the inner agent-side network from the client.

Cryptographic mechanisms can be used to protect and to provide integrity of the tunneled data. These cryptographic mechanisms can include SSL, TLS, etc. Thus, the invention can include a three component secure tunnel.

The complexities involved with creating such a three component secure tunnel are primarily caused by the typical firewall protecting the client and the typical firewall protecting the inner agent. Firewalls restrict incoming and outgoing connections going through them.

Packet filtering firewalls can block packets based on the headers of the packets. These typically restrict incoming and outgoing packets to a limited set of TCP and UDP ports. The incoming packets are usually more restricted than the outgoing packets, and it is possible that no incoming packets to internal services are allowed at all.

Application level firewalls inspect the packet and restrict it based on the protocol being used for the connection and the protocol data in the packet. They can detect when a protocol may be being used in an unexpected or dangerous way.

A typical strict firewall configuration may block all inbound connections and only allow outbound connections on the http and https ports (for web browsing). In addition these outbound connections may be subject to protocol inspection.

Different users may want access to internal services from different locations and therefore through different firewalls or the same user may want access from different locations. This makes it complicated to allow user access by changing firewall rules. Users may have little or no control of the restrictions imposed on them by the firewalls and it is likely that different entities control the client-side and the inner agent-side firewalls making cooperation difficult (for example an ISP (internet service provider) might control the client-side firewall and the company the user works for controls the inner agent-side). It is unlikely that the different entities will cooperate or contemplate changing firewall rules to allow user access through their firewall.

A three component secure tunnel model solves these problems and provides secure access from the client machine to the internal services on the inner agent-side network.

The invention can include an approach that has several important aspects which help to bypass firewall restrictions. Connections for the secure tunnel can be always initiated from inside the firewall and are outgoing. This helps to bypass packet filtering firewalls. The connections can be always to a known port to which access is not usually restricted (e.g., the https port, 443). This helps to bypass packet filtering firewalls. Of course, any and all port(s) can be used where the applicable firewall will be expecting to see the traffic associated with the invention. The connections can be done over an SSL layer which hides the content of the packets. This helps to bypass application level firewalls.

The connections can mimic https connection behaviour. Although because of the SSL layer an application firewall cannot read the packet content, it can potentially distinguish unusual traffic on the https port by traffic analysis. For example by monitoring the time a connection stays in established state, of the amount of data sent and received. The invention can include techniques described below to mitigate this problem and help bypass application level firewalls which do traffic analysis. Briefly, the techniques can include hopping, optionally dropping and/or simultaneously opening several connections, or other approaches to mimic traffic that the applicable firewall(s) will be expecting to see and permit. The client creates an end to end SSL connection with the inner agent which ensures that the tunneled data can only be accessed by the client system and inner agent system.

The invention can have three components, a client, an outer agent (OA) and an inner agent (IA). The client, outer agent and inner agent can all be protected by firewalls. The client and inner agent firewalls can have firewalls which allow only outgoing connections. The outer agent firewall should allow incoming connections. Connections going through the firewalls can be inspected by the firewalls to check that the traffic is appropriate for the port number the traffic is connecting on.

Referring to FIG. 1, a client 110 is coupled to the internet 100 through a client firewall 120. An outer agent 130 is coupled to the internet 100 through an outer agent firewall 140. An inner agent 150 is coupled to the internet 100 through an inner agent firewall 160. An internal network 170 is coupled to the inner agent 150.

The outer agent acts as relay providing both connection rendezvous for the outbound connections from the client and inner agent and provide relaying of data between them. Because the connections used between the client and outer agent and between the inner agent and outer agent are standard SSL connections on the standard https port (443), they will be allowed to pass through the firewalls (and any proxy servers that are in use). Finally because a further SSL connection is established layered on top of the connections from client to outer agent and inner agent to outer agent between the client and inner agent then the content of this layered connection is secured both from eavesdropping and tampering on the network connections and from outer agent components. It is important to note that because the outer agent has to be access able directly from the public internet, it is assumed that the outer agent may be compromised thus steps are taken (e.g., the use of the layered connection (inner SSL)) to prevent a compromised outer agent from gaining access to or corrupting tunneled data between the client and the inner agent.

The inner agent to outer agent connection will now be described. In order to accept connections the inner agent must first make an out going connection to the outer agent. This initial out going connection is a control connection. It is not used to tunnel data traffic from clients but to facilitate the creation of new connections from inner agent to outer agent when needed. This control connection stays established while the inner agent is supposed (ready) to accept tunnelled connections. This connection can be established as follows:

IA makes a TCP connection to outer agent and then

IA negotiates SSL/TLS over this TCP connection.

The inner agent expects the outer agent certificate (OAC) to be presented by the outer agent as part of the SSL/TLS negotiation and closes the connection if this is not the case. The SSL/TLS session negotiated is $SSLSession_{CC}$ and the SSL/TLS session id is $SID_{CC}$. This connection is $C_{CC}$.

The SSL/TLS session is cached on both the inner agent and the outer agent. This means the control connection can be re-established by resuming the session, a full SSL/TLS negotiation does not have to be done.

The client to inner agent connection will now be described. When a client wishes to make a tunnelled connection to the inner agent it must go via the outer agent. This initial connection can be established as follows:

The client makes a TCP connection to the outer agent.

The client negotiates SSL/TCP over this TCP connection. The client expects the outer agent certificate (OAC) to be presented as part of the SSL/TLS negotiation and closes the connection if this is not the case. The SSL/TLS session negotiated is $SSLSession_{CO1}$, and the SSL/TLS session id is $SID_{CO1}$. This connection is $C_{CO1}$.

The outer agent requests the inner agent to create a new connection by sending a request down $C_{CC}$.

The inner agent makes a new TCP connection to the outer agent and resumes SSL/TLS session $SSLSession_{CC}$ on that new connection. This new connection is $C_{IO1}$.

The outer agent now proxies any data traffic received on $C_{CO1}$ to $C_{IO1}$. It decrypts/encrypts traffic received/sent on $C_{CO1}$ using $SSLSession_{CO1}$ and encrypts/decrypts traffic sent/received on $C_{IO1}$ using $SSLSession_{CC}$.

The client negotiates SSL/TLS with inner agent using $C_{CO1}$ which is proxied to the inner agent by the outer agent. This is a very important stage or step in the process. The client expects the Inner Agent Certificate (IAC) to be presented by the inner agent as part of the SSL/TLS negotiation and closes the connection if that is not the case. The SSL/TLS session negotiated is $SSLSession_{CI1}$, and the SSL/TLS session id is $SID_{CI1}$.

The client and inner agent now have an secure tunnel via outer agent along which they can pass arbitrary data. $SSLSession_{CO1}$ and $SSLSession_{CC}$ can be termed outer SSL/TLS sessions and layered on top of them is $SSLSession_{CI1}$ which can be termed an inner SSL/TLS session. To send data the client must first encrypt it using $SSLSession_{CI1}$ then encrypt again with $SSLSession_{CO1}$. To receive data the client must first decrypt it with $SSLSession_{CO1}$ then decrypt again with $SSLSession_{CI1}$. To send data the inner agent must first encrypt it with $SSLSession_{CI1}$ then encrypt again with $SSLSession_{CC}$. To receive data the inner agent must first decrypt it with $SSLSession_{CC}$ then decrypt again with $SSLSession_{CI1}$.

The client, outer agent and inner agent cache SSL/TLS sessions, so when making subsequent connections the client, inner agent and outer agent should not have to go through a full SSL/TLS negotiation, they may resume a cached session.

The implications and modification of the resulting connection lifetime will now be described. Although connections established by the process above may stay established as long as is necessary for the client to access services on the network the inner agent is on, long lived connections are not typical for the normal https traffic the invention advantageously mimics. In order to better mimic https connections, the invention can limit the time some connections last. The $C_{CO1}$ and $C_{IO1}$ may be closed periodically in same manner that https connections are closed. Although this mimics https traffic better, it is potentially inefficient. Several ways to reduce this inefficiency will now be described.

The invention can simply not drop connections in this manner at all. Not all firewalls will drop long-lived https connections, so it may not be necessary to drop and re-establish connections. Although $C_{CO1}$ and $C_{IO1}$ are closed, the inner (layered) SSL/TLS session running on top of them ($SSLSession_{CI1}$) does not need to be dropped. Data traffic flowing over this connection can be paused and then resumed when $C_{CO1}$ and $C_{IO1}$ (or their hopped counterparts) are re-established.

The client can create another tunnel connection to the inner agent before dropping the current one. This means that data traffic does not have to be paused, it can just be moved to the new tunnel before the current one is closed. This can be termed hopping. SSL/TLS sessions $SSLSession_{CO1}$ and $SSLSession_{CC}$ can be cached, so re-establishing $C_{CO1}$ and $C_{IO1}$ does not involve expensive cryptographic operations.

A preferred embodiment of the invention is shown in FIG. 1. The client and inner agent components are placed behind firewalls that may have a very strict configuration only allowing outbound http/https traffic. The outer agent is located on the internet and is protected by a firewall that is configured to allow inbound connections on the https port. The outer agent may be provided and managed by a third party to provide the tunnel service. In this configuration no changes are required to be made by the organization using the inner agent or client components to a typical firewall configuration. Because of the method used data flowing via the outer agent is opaque to the outer agent and is secure against eavesdropping.

Alternate embodiments of the invention may remove one or more of the firewalls without compromise of the system. An example of such an alternative embodiment is shown in FIG. 2.

Figure 2:
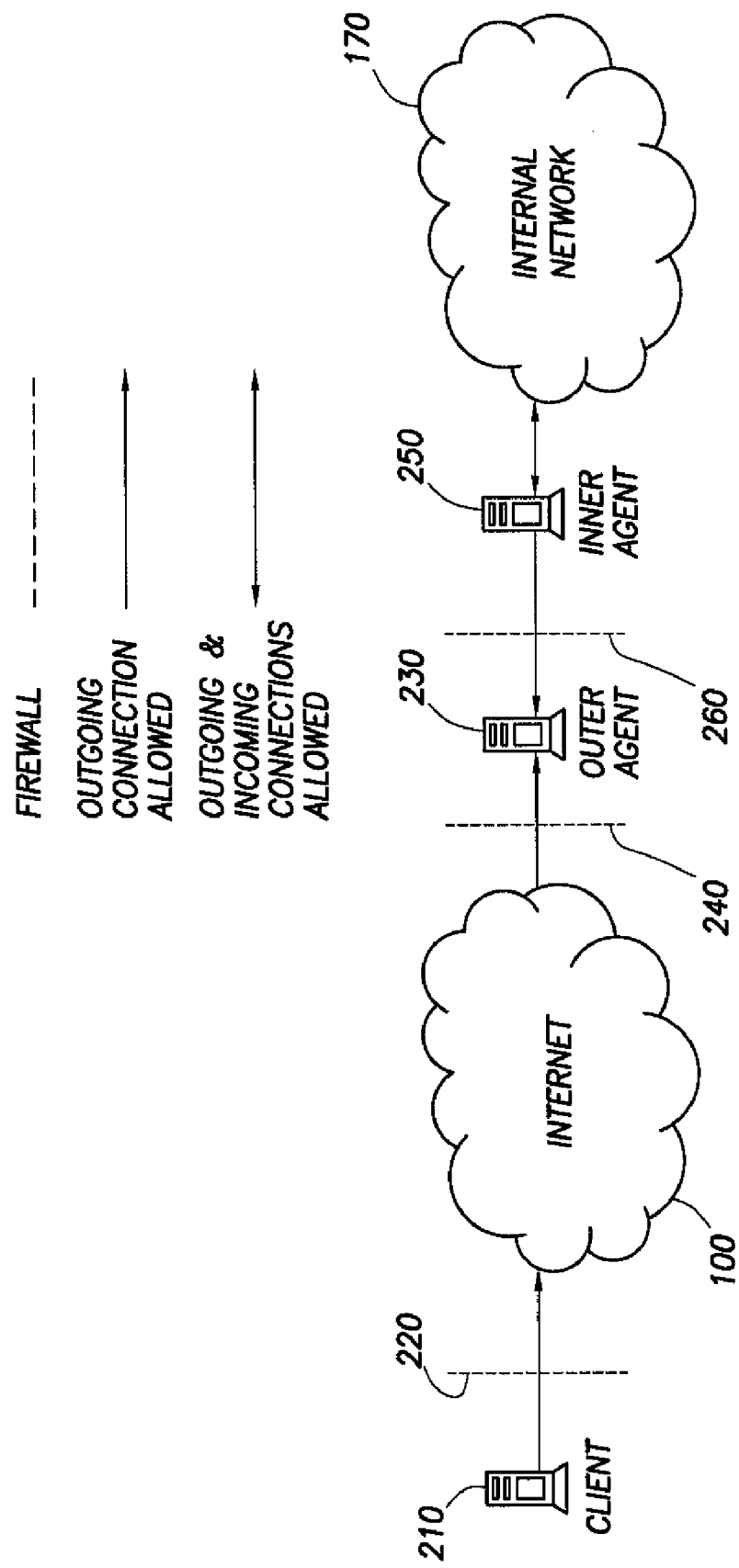
FIG. 2 is a block schematic view of another three component secure tunnel system, representing an embodiment of the invention.

Referring to FIG. 2, a client 210 is coupled to the internet 100 through a client firewall 220. An outer agent 230 is coupled to the internet 100 through an outer agent firewall 240. An inner agent 250 is coupled to the outer agent 230 through an inner agent firewall 260. An internal network 170 is coupled to the inner agent 250. This configuration may be used when the deploying organization wishes to control or own the outer agent and so would place the outer agent inside of organizations DMZ (demilitarized zone), which are the resources between the two firewalls adjacent the outer agent.

An important aspect of the invention can be the use of standard SSL/TTLS outbound connections on standard port numbers to an outer agent to allow the establishment of an end to end connection (via a rendezvous and relay mechanism) while being indistinguishable from "normal" https traffic to a packet inspecting firewall. Thus being able to pass through any number of firewalls and proxy servers with out interruption.

Another important aspect of the invention can be the use of a third SSL/TLS connection layer(s) over the above end to end connection to provide security of the tunneled data both over network connections and to the (possibly compromised) components running on the outer agent, thereby providing a secure end to end connection that can pass through firewalls etc.

Thus, the invention can include a secure tunnel communications system, comprising: an inner agent; an outer agent coupled to the inner agent; and a client coupled to the outer agent, characterized by establishing a first connection ($C_{IO}$) from the inner agent to the outer agent including making a first TCP connection from the inner agent to the outer agent, negotiating a first SSL/TLS session ($SSLSession_{IO}$) between the inner agent and the outer agent over the first TCP connection and applying the first SSL/TLS session (SSLSession$_{IO}$) between the inner agent and the outer agent over the first TCP connection, establishing a second connection (C$_{CO}$) from the client to the outer agent including making a second TCP connection from the client to the outer agent, negotiating a second SSL/TLS session (SSLSession$_{CO}$) between the client and the outer agent over the second TCP connection and applying the second SSL/TLS session (SSLSession$_{CO}$) between the client and the outer agent over the second TCP connection, and then negotiating a third SSL/TLS session (SSLSession$_{CI}$) between the client and the inner agent via both the first SSL/TLS session (SSLSession$_{IO}$) and the second SSL/TLS session (SSLSession$_{CO}$) and applying the third SSL/TLS session (SSLSession$_{CI}$) between the client and the inner agent layered over both the first SSL/TLS session (SSLSession$_{IO}$) and the second SSL/TLS session (SSLSession$_{CO}$).

The invention can include caching the first SSL/TLS session (SSLSession$_{IO}$) as a set of state information on both the inner agent and the outer agent. The invention can include sending a request from the outer agent to the inner agent via the first connection (C$_{IO}$) to establish a new connection (C$_{IOnew}$) from the inner agent to the outer agent; then establishing the new connection (C$_{IOnew}$) from the inner agent to the outer agent; and then resuming the first SSL/TLS session (SSLSession$_{IO}$) using the set of state information on the new connection (C$_{IOnew}$).

The client can close the second connection (C$_{CO}$) if the outer agent does not present an outer agent certificate (OAC) as part of negotiating the second SSL/TLS session (SSLSession$_{CO}$). The second connection (C$_{CO}$) from the client to the outer agent can be through TCP port 443. The inner agent can close the first connection (C$_{IO}$) if the outer agent does not present an outer agent certificate (OAC) as part of negotiating the first SSL/TLS session (SSLSession$_{IO}$). The first connection (C$_{IO}$) from the inner agent to the outer agent can be through TCP port 443. The client can close the second connection (C$_{CO}$) if the inner agent does not present an inner agent certificate (IAC) as part of negotiating the third SSL/TLS session (SSLSession$_{CI}$).

The outer agent can include a series of N multiple outer agents, the second TCP connection can be between the client and a first outer agent (Outeragent1), the first TCP connection can be between the inner agent and an nth outer agent (OuteragentN) and the new connection (C$_{IOnew}$) can be between the inner agent and the nth outer agent (OuteragentN). The invention can include, before negotiating the third SSL/TLS session (SSLSession$_{CI}$) between the client and the inner agent, making at least another TCP connection among the series of N multiple outer agents, negotiating at least another SSL/TLS session among the series of N multiple outer agents and applying the at least another SSL/TLS session among the series of N multiple outer agents. The invention can include, after negotiating the third SSL/TLS session (SSLSession$_{CS}$) between the client and the inner agent, ceasing to apply the at least another SSL/TLS session among the series of N multiple outer agents.

The invention can include establishing another connection (C$_{COm}$) from another client to the outer agent including making another TCP connection from the another client and the outer agent and negotiating another SSL/TLS session (SSLSession$_{COm}$) between the another client and the outer agent over the another TCP connection.

The invention can include establishing another connection (C$_{IOo}$) from the inner agent to another outer agent including making another TCP connection from the inner agent to the another outer agent and negotiating another SSL/TLS session (SSLSession$_{IOo}$) between the inner agent and the another outer agent over the another TCP connection; and caching the another SSL/TLS session (SSLSession$_{IOo}$) as another set of state information on both the inner agent and the another outer agent.

Three Component Tunnel Routing

The invention can include combining the three component tunnel system with an extension to support more than one inner agent with a single outer agent.

Figure 3:
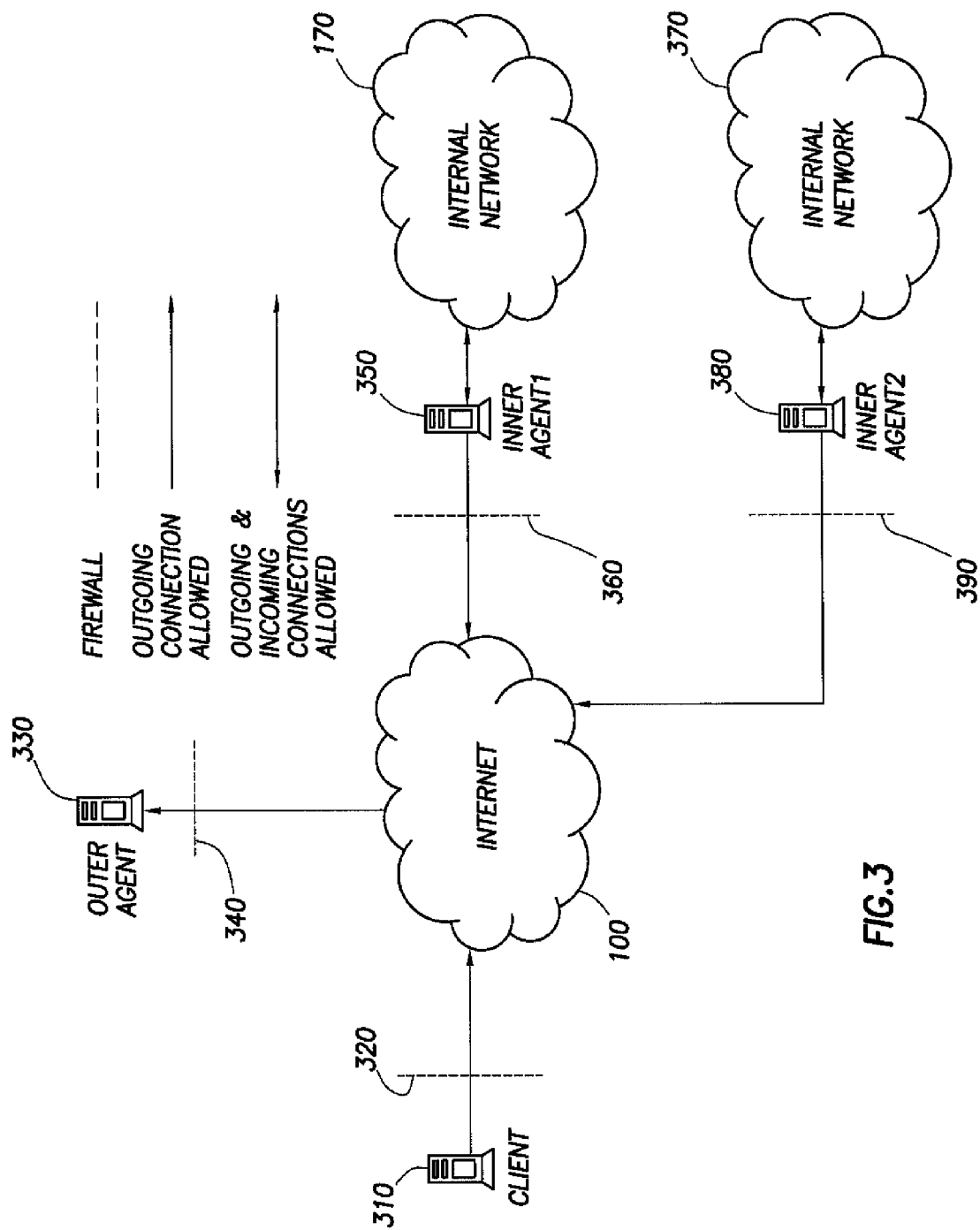
FIG. 3 is a block schematic view of a secure tunnel system including two inner agents, representing an embodiment of the invention.

Referring to FIG. 3, a client 310 is coupled to the internet 100 through a client firewall 320. An outer agent 330 is coupled to the internet 100 through an outer agent firewall 340. A first inner agent 350 is coupled to the internet 100 through a first inner agent firewall 360. An internal network 170 is coupled to the first inner agent 350. A second inner agent 380 is coupled to the internet 100 through a second inner agent firewall 390. Another internal network 370 is coupled to the second inner agent 380.

In order to support more than one inner agent, the client must tell the outer agent which inner agent it wants to connect to and the outer agent must route its connection to the correct inner agent An extended protocol to support more than one inner agent will now be described.

Inner Agent to Outer Agent Connection

In order to accept connections each inner agent must first make an out going connection to the outer agent. This initial out going connections is a control connection. It is not used to tunnel data traffic from clients but to facilitate the creation of new connections from inner agent to outer agent when needed. This control connection stays established while the inner agent is accepting tunnelled connections.

The connection for inner agent$_n$ is established as follows:

Inner agent$_n$ makes a TCP connection to outer agent.

Inner agent$_n$ negotiates SSL/TLS over this TCP connection. Inner agent$_n$ expects the outer agent certificate (OAC) to be presented by the outer agent as part of the SSL/TLS negotiation and closes the connection if this is not the case. The SSL/TLS session negotiated is SSLSession$_{CCn}$. This connection is C$_{CCn}$.

The SSL/TLS session is cached on both IA$_n$ and the outer agent. This means the control connection can be re-established by resuming the session, a full SSL/TLS negotiation does not have to be done.

Client to Inner Agent Connection

When a client wishes to make a tunnelled connection to an inner agent it must go via the outer agent.

This initial connection is established as follows:

The client makes a TCP connection to the outer agent.

The client negotiates SSL/TCP over this TCP connection. The client expects the Outer Agent Certificate (OAC) to be presented as part of the SSL/TLS negotiation and closes the connection if this is not the case. The SSL/TLS session negotiated is SSLSession$_{CO1}$. This connection is C$_{CO1}$.

The client sends a request to the outer agent over C$_{CO1}$ asking to be connected to inner agent$_n$.

The outer agent asks inner agent$_n$ to create a new connection by sending a request down C$_{CCn}$.

Inner agent$_n$ makes a new TCP connection to the outer agent and resumes SSL/TLS session SSLSession$_{CCn}$ on that new connection. This new connection is C$_{InO1}$.

The outer agent now proxies any data traffic received on C$_{CO1}$ to C$_{InO1}$. It decrypts/encrypts traffic received/sent on C$_{CO1}$ using SSLSession$_{CO1}$ and encrypts/decrypts traffic sent/received on C$_{InO1}$ using SSLSession$_{CCn}$.

The client negotiates SSL/TLS with inner agent, using C$_{CO1}$ which is proxied to inner agent$_n$ by the outer agent. The client expects the inner agent certificate for inner agent$_n$ ($IAC_N$) to be presented by inner agent$_n$ as part of the SSL/TLS negotiation and closes the connection if that is not the case. The SSL/TLS session negotiated is $SSLSession_{CIn1}$.

The client and inner agent$_n$ now have an encrypted tunnel via outer agent along which they can pass arbitrary data. To send data the client must first encrypt it using $SSLSession_{CIn1}$ then encrypt again with $SSLSession_{CO1}$. To receive data the client must first decrypt it with $SSLSession_{CO1}$ then decrypt again with $SSLSession_{CIn1}$. To send data, inner agent$_n$ must first encrypt it with $SSLSession_{CIn1}$ then encrypt again with $SSLSession_{CCn}$. To receive data, inner agent$_n$ must first decrypt it with $SSLSession_{CCn}$ then decrypt again with $SSLSession_{CIn1}$.

The client, outer agent and inner agent$_n$ cache SSL/TLS sessions, so when making subsequent connections the client, inner agent$_n$ and outer agent should not have to go through a full SSL/TLS negotiation, they may resume a cached session.

Thus, the invention can include establishing another connection ($C_{IOn}$) from another inner agent to the outer agent including making another TCP connection from the another inner agent to the outer agent and negotiating another SSL/TLS session ($SSLSession_{IOn}$) between the another inner agent and the outer agent over the another TCP connection; and caching the another SSL/TLS session ($SSLSession_{IOn}$) as another set of state information on both the another inner agent and the outer agent.

Efficient SSL/TLS Layering

The invention can include an efficient way of layering an SSL or TLS connection on top of other SSL or TLS connections.

The secure sockets layer (SSL) protocol provides privacy and reliability between two communication end-points. The transport layer security (TLS) is essentially the most recent version of SSL. SSL and TLS are end-to-end protocols; an important property of SSL and TLS is that any modification of data by intermediate communication nodes will be detected by the end-points; another is that intermediate communication nodes cannot decrypt and view the data traffic being passed between end-points.

These properties mean that it is sometimes desirable to layer one SSL or TLS session on top of another SSL or TLS session.

For example if a client is unable to establish a direct connection to an inner agent on another network because the firewall protecting the inner agent allows only outgoing SSL and/or TLS connections. The firewall on the client also only allows outgoing SSL and/or TLS connections. The client must make an outgoing SSL or TLS connection to an outer agent, the inner agent must make an outgoing SSL or TLS connection to the outer agent and the outer agent can allow them to exchange data (see FIG. 4). However such a connection is not secure from tampering and eavesdropping by the outer agent. It may therefore be desirable to layer another SSL or TLS layer over the established connection (see FIG. 5).

This extra SSL or TLS layer provides security and integrity from the client all the way to the inner agent; the outer agent cannot obtain the plain text data from the connection it is proxying and it cannot modify the data without the client and inner agent detecting it.

An important attribute of this layering is that it is impossible for a system located between the client and outer agent or between the outer agent and inner agent to detect that the connection is layered. This means that to a firewall located in such a position the layered connection is indistinguishable from a normal un-layered SSL or TLS connection.

Another important attribute is that because the outer SSL or TLS layer encrypts the inner SSL or TLS protocol it is impossible for a system between the client and outer agent or between the outer agent and inner agent to determine the end-point of the inner SSL or TLS connection. The systems in-between do not know if the connection is being proxied on to somewhere else, the outer SSL or TLS layer hides the inner SSL or TLS layer so the X509 certificate giving the inner agent name which is passed as part of the SSL or TLS (layered) inner (upper) negotiation cannot be viewed by these in-between systems.

Figure 4:
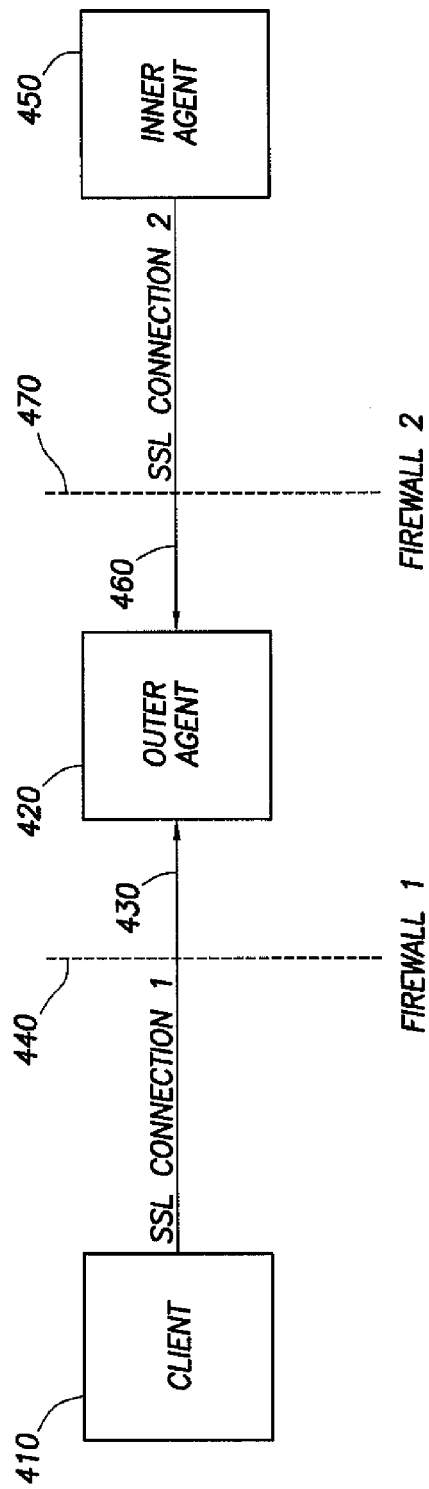
FIG. 4 is a block schematic view of another three component secure tunnel system, representing an embodiment of the invention.

Referring to FIG. 4, a client 410 is coupled to an outer agent 420 via a first SSL connection 430 that passes through a first firewall 440. An inner agent 450 is coupled to the outer agent 420 via a second SSL connection 460 that passes through a second firewall 470.

Figure 5:
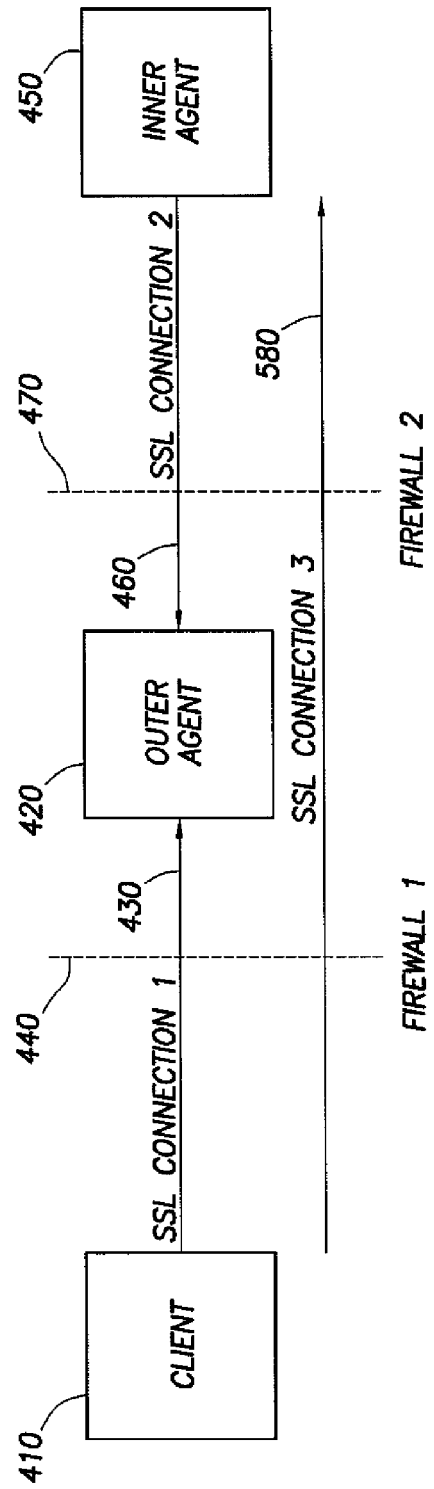
FIG. 5 is a block schematic view of another three component secure tunnel system, representing an embodiment of the invention.

Referring to FIG. 5, the client 410 is coupled to the inner agent 450 via a third SSL connection 580 that passes through the first firewall 440 and the second firewall 470. The third SSL connection is layered over the first SSL connection 430 and the second SSL connection 460.

Layering SSL or TLS traffic in this way is however a computationally expensive way to do things. The layering of the SSL or TLS protocols means that the number of cryptographic operations performed by the client and the other inner agent is double that of a single SSL or TLS session. Also (in the situation shown in FIG. 5) the outer agent must decrypt traffic coming from the client on Connection 1 and encrypt it again to send it to the Inner agent on Connection 2. A block of data must have six cryptographic operations (encryption/decryption) performed on it in order for it to be passed from the client to the inner agent. Often after SSL Connection 1 and SSL Connection 2 have been established and sent some initial data, only SSL Connection 3, the one which preserves confidentiality and reliability, is needed.

The invention can include an approach to reduce the number of cryptographic operations per block to only two while still retaining the important attributes of the layered SSL or TLS connection as discussed above.

SSL is designed to be layered over other protocols and have other protocols layered over it, however it is not explicitly designed to be layered over itself and naively doing so is very inefficient. TLS has the same disadvantage as SSL.

Component Parts

Client—client which wishes to talk to the Inner agent and the Outer agent.

Outer agent—System which proxies traffic between client and Inner agent.

Inner agent—Inner agent with which the client wishes to communicate with via the outer agent.

Outer AgentC—outer agent Certificate. The X509 certificate which the outer agent presents to the client and the Inner agent to verify its identity as part of the SSL protocol.

Inner AgentC—The Inner agent Certificate. The X509 certificate which the Inner agent presents to the client to verify its identity as part of the SSL protocol.

$C_{CP}$—A client to outer agent data connection.

$C_{SP}$—An inner agent to outer agent data connection.

$SSLSession_{SP}$—The SSL session established between the Inner agent and outer agent on $C_{SP}$.

$SSLSession_{CP}$—The SSL session established between the client and the outer agent on $C_{CP}$.

$SSLSession_{CS}$—The SSL session established between the client and the Inner agent and being proxied by the outer agent.

Steps

Client to Inner agent Connection

When a client wishes to make a tunneled connection to the Inner agent it must go via the outer agent.

This initial connection can be established as follows:

The client makes a TCP connection to the outer agent.

The client negotiates SSL over this TCP connection. The client expects the outer agent Certificate (outer agentC) to be presented as part of the SSL negotiation and closes the connection if this is not the case. The SSL session negotiated is SSLSession$_{CP}$. This connection is C$_{CP}$.

The Inner agent makes a new TCP connection to the outer agent.

The Inner agent negotiates SSL over this connection. The Inner agent expects the outer agent Certificate (outer agentC) to be presented as part of the SSL negotiation and closes the connection if this is not the case. The SSL session negotiated is SSLSession$_{SP}$. This connection is C$_{SP}$.

The outer agent now proxies any data traffic received on C$_{CP}$ to C$_{SP}$. It decrypts/encrypts traffic received/sent on C$_{CP}$ using SSLSession$_{CP}$ and encrypts/decrypts traffic sent/received on C$_{SP}$ using SSLSession$_{SP}$. The outer agent inspects the data traffic it is proxying, looking for a SSL Finished message from Inner agent on C$_{SP}$.

The client negotiates SSL with Inner agent using C$_{CP}$ which is proxied on C$_{SP}$ to the Inner agent by the outer agent. The client expects the Inner agent Certificate (Inner agentC) to be presented by the Inner agent as part of the SSL negotiation and closes the connection if that is not the case. The SSL session negotiated is SSLSession$_{CS}$.

After sending the SSL Finished message as the final part of the SSL negotiation in step six, the Inner agent stops applying SSLSession$_{SP}$ to C$_{SP}$. This dropping of the outer (lower) SSL session is an important stage of the procedure.

The outer agent receives the SSL Finished message from the Inner agent on C$_{SP}$ and passes it on to the client. It then stops applying SSLSession$_{CP}$ to C$_{CP}$. It also stops applying SSLSession$_{SP}$ to C$_{SP}$.

On receiving the SSL Finished message the client stops applying SSLSession$_{CP}$ to C$_{CP}$.

The client and Inner agent now have an encrypted tunnel via outer agent along which they can pass arbitrary data. The client encrypts/decrypts on C$_{CP}$ with SSLSession$_{CS}$. The outer agent just proxies data and does no further encryption/decryption. The Inner agent encrypts/decrypts on C$_{SP}$ with SSLSession$_{CS}$.

The client, outer agent and Inner agent cache SSL sessions, so when making subsequent connections the client, Inner agent and outer agent should not have to go through a full SSL negotiation, they may resume a cached session.

The transition from one layer of SSL to two layers of SSL and back to to one layer of SSL is opaque to any system which can observe the network traffic except the client, the outer agent and the inner agent. So a client-side firewall or an inner agent-side firewall would not be able to detect this transition.

The preferred embodiment is as described above and as shown in FIG. 5. Another alternative embodiment is to have the outer agent to Inner agent SSL connection initiated by the outer agent as shown in FIG. 6.

Figure 6:
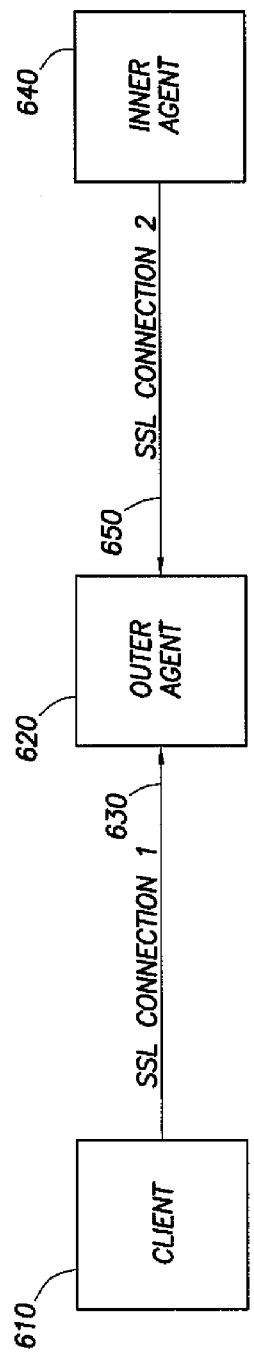
FIG. 6 is a block schematic view of another three component secure tunnel system, representing an embodiment of the invention.

Referring to FIG. 6, a client 610 is coupled to an outer agent 620 via a first SSL connection 630. The outer agent 620 is coupled to an inner agent 640 via a second SSL connection 650.

Figure 7:
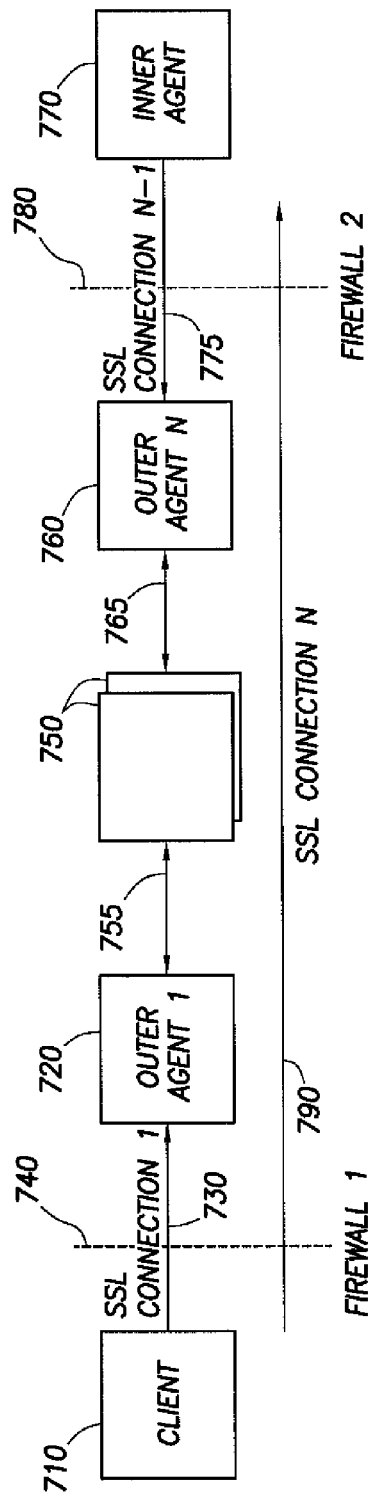
FIG. 7 is a block schematic view of a secure tunnel system including a series of N outer agents, representing an embodiment of the invention.

Another alternative embodiment is to have multiple outer agents as shown in FIG. 7.

Referring to FIG. 7, a client 710 is coupled to a first outer agent 720 via a first SSL connection 730 that passes through a first firewall 740. The first outer agent 720 is coupled to a series of outer agents 750 via connection 755. The series of outer agents 750 is coupled to an Nth outer agent 760 via connection 765. The Nth outer agent 760 is coupled to an inner agent 770 via an N-1 SSL connection 775 that passes through a second firewall 780. The client 710 is coupled to the inner agent 770 via an Nth SSL connection 790 that passes through the first firewall 740 and the second firewall 780.

Another alternative embodiment is to have multiple connections going through a single outer agent. So one or more clients connect to one or more Inner agents through a single outer agent.

These alternative embodiments may require additional steps in order to connect multiple connections together correctly. There are many ways to do this.

There are many alternative embodiments with different network topology.

It is important to appreciate that layering one SSL or TLS session on top of another is very computationally expensive. The invention reduces amount of computation needed. The number of encryption operations per block for the bulk data transfer is reduced from six in a start-up situation as shown in FIG. 5 to only two encryption operations after the individual SSL connections are no longer applied with the invention.

It is also important to appreciate that layering of one SSL or TLS session on top of another also requires more data to be sent over the network because of the extra headers needed by the record layer of the SSL and TLS protocols. The invention can remove the extra record layer, thereby requiring less data (overhead) to be sent.

The invention retains important properties of layered SSL or TLS such as end-to-end security and integrity of communication between client and inner agent.

The transition between single and multiple layers of SSL or TLS is undetectable to any other system on the network except for the client, the outer agent (or outer agents) and the inner agent.

Thus, the invention can include a secure tunnel communications system, comprising: an inner agent; an outer agent coupled to the inner agent; and a client coupled to the outer agent, characterized by establishing a first connection (C$_{IO}$) from an inner agent to an outer agent including making a first TCP connection from the inner agent to the outer agent, negotiating a first SSL/TLS session (SSLSession$_{IO}$) between the inner agent and the outer agent over the first TCP connection and applying the first SSL/TLS session (SSLSession$_{IO}$) between the inner agent and the outer agent over the first TCP connection; establishing a second connection (C$_{CO}$) from a client to the outer agent including making a second TCP connection from the client to the outer agent, negotiating a second SSL/TLS session (SSLSession$_{CO}$) between the client and the outer agent over the second TCP connection and applying the second SSL/TLS session (SSLSession$_{CO}$) between the client and the outer agent over the second TCP connection; then negotiating a third SSL/TLS session (SSLSession$_{CI}$) between the client and the inner agent via both the first SSL/TLS session (SSLSession$_{IO}$) and the second SSL/TLS session (SSLSession$_{CO}$) and applying the third SSL/TLS session (SSLSession$_{CI}$) between the client and the inner agent layered over both the first SSL/TLS session (SSLSession$_{IO}$) and the second SSL/TLS session (SSLSession$_{CO}$); and then ceasing to apply the first SSL/TLS session (SSLSession$_{IO}$) between the inner agent and the outer agent and ceasing to apply the second SSL/TLS session (SSLSession$_{CO}$) between the client and the outer agent. The invention can include a computer readable medium, including a program for performing secure tunnel communications.

Authentication of Tunneled Connections

The invention can include a method to allow authenticated clients secure access to an inner agent while protecting the inner agent from unauthorised client access and malicious attacks by using an outer agent which can distinguish between authenticated and unauthenticated clients.

Figure 8:
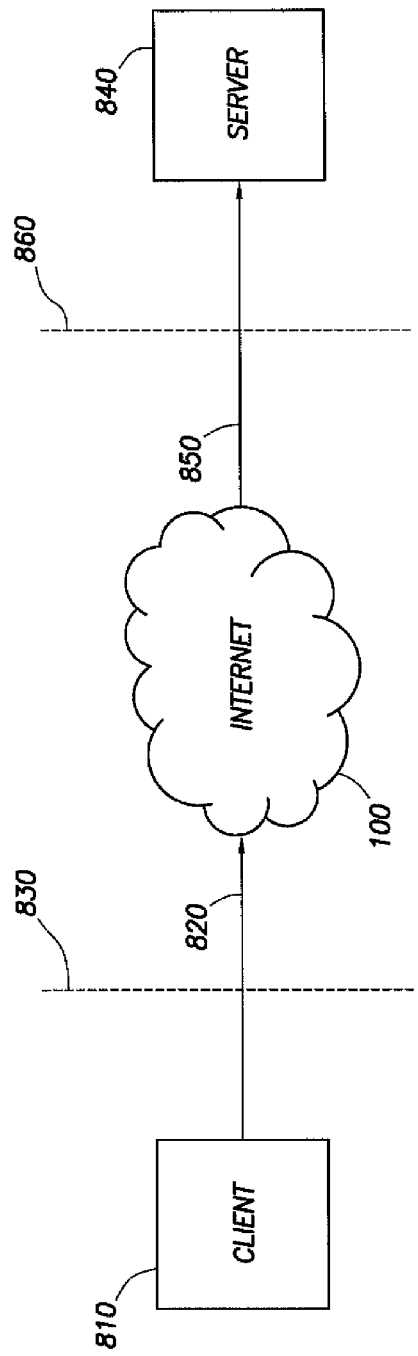
FIG. 8 is a block schematic view of a client accessing a server via the internet, appropriately labeled "Prior Art."

Referring to FIG. 8, a client 810 is coupled to the internet 100 via a connection 820 that passes through a first firewall 830. A server 840 is coupled to the internet 100 via a connection 850 that passes through a second firewall 860.

Typically a client accessing an server over the internet will access it directly. The client-side firewall will allow the client out-going access to the internet, and the firewall on the server-side will allow traffic from the internet to access services on the server (see FIG. 8). The problem with this model is that allowing direct access from the internet to services on the server can make the server vulnerable to attacks from malicious clients.

These attacks may be designed to exploit errors in the services on the server machine or they may be denial of service attacks. Denial of service attacks are malicious attacks aimed at saturating the resources of a system in order to deny authorised users use of that system. For example an attack might open a large number of TCP connections to an server, tying up CPU, memory and network bandwidth. If the malicious connections tie up enough resources there are no resources left on the server to deal with valid connections.

Figure 9:
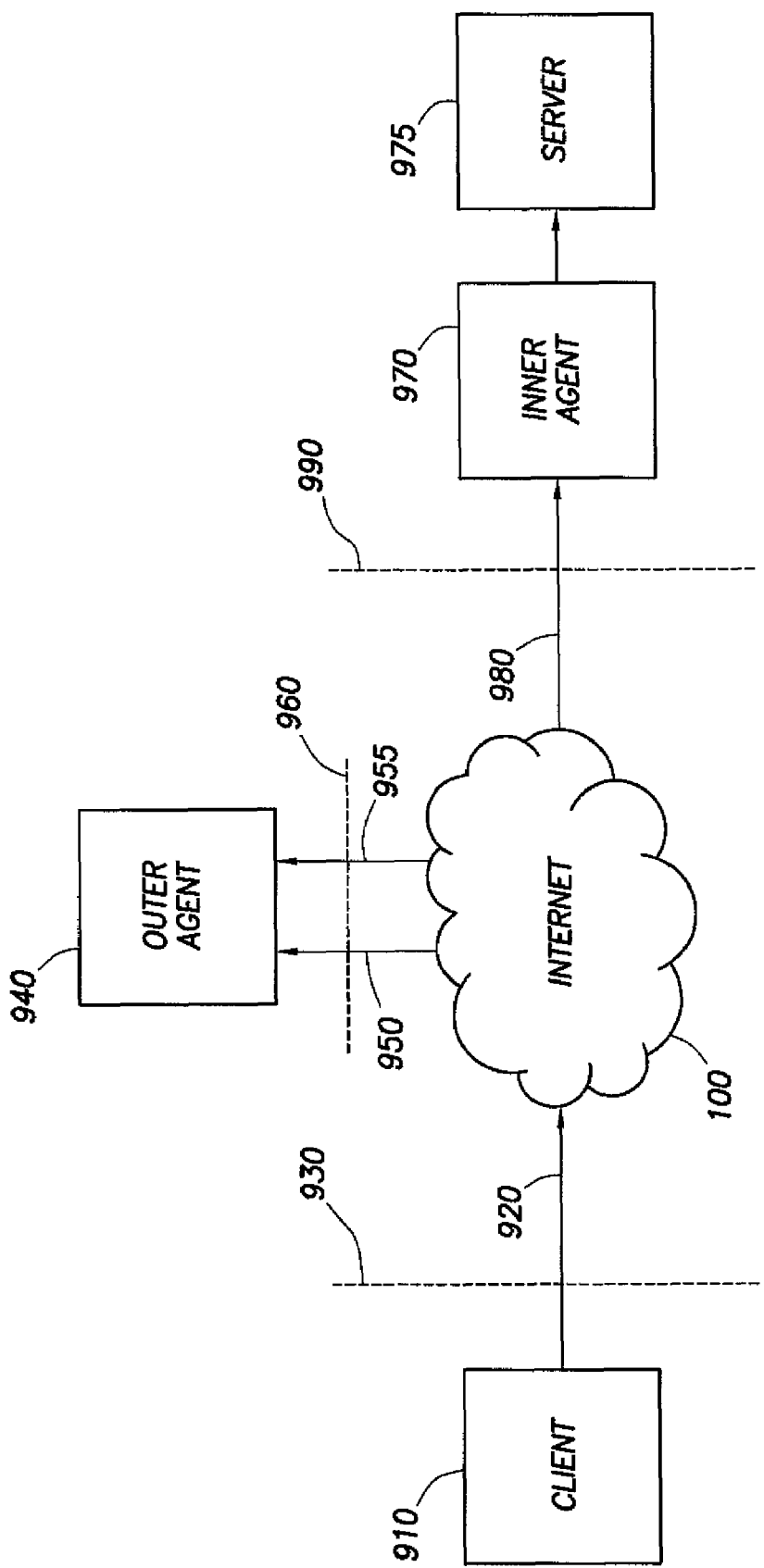
FIG. 9 is a block schematic view of another three component secure tunnel system, representing an embodiment of the invention.

An approach that eliminates or mitigates these problems is shown in FIG. 9. Referring to FIG. 9, a client 910 is coupled to the internet 100 via a connection 920 that passes through a first firewall 930. An outer agent 940 is coupled to the internet 100 via a connection 950 and a connection 955 that both pass through a second firewall 960. An inner agent 970 is coupled to the internet 100 via a connection 980 that passes through a third firewall 990. A server 975 is coupled to the inner agent 970.

The firewall on the inner agent-side allows only out-going connections and therefore all connections to the inner agent are forced to go through the outer agent. The method we describe is one which controls client connections at the outer agent, protecting the inner agent from malicious attacks.

Allowing client access only through an outer agent and authenticating those clients allows us to apply restrictions on the connections a client has through the outer agent. For example we can restrict which users have access through the outer agent, from where they access the service and we can enforce limits on the amount of bandwidth used in connections to the inner agent.

Controlling client access in this way also allows us to mitigate the effects of a denial of service attack on the system.

The method described gives a way of authenticating clients in order that potential malicious attacks on the inner agent are minimized.

The outer agent acts as a shield in front of the inner agent, so although denial of service attacks may affect the outer agent the inner agent should be protected from them. Therefore the inner agent can still be accessed via other proxies and is still available to internal users who do not access it over the internet. In this model the outer agent itself is the only system open to direct attack.

Two basic authentication methods are described. One which authenticates the users via the outer agent using authentication systems connected to the inner agent, and one which uses X509 certificates to authenticate the user directly at the outer agent.

The SSL protocol describes how to authenticate a connection but it relies on the client being able to make a direct connection to the inner agent. Firewalls may block this connection. TLS is essentially the latest evolution of SSL and suffers the same problem.

Component Parts

Client—client which wishes to talk to the Inner agent and the outer agent.

Outer agent—System which proxies traffic between client and Inner agent.

Inner agent—Inner agent with which the client wishes to communicate with via the outer agent.

Outer AgentC—outer agent Certificate. The X509 certificate which the outer agent presents to the client and the Inner agent to verify its identity as part of the SSL protocol.

Inner AgentC—The Inner agent Certificate. The X509 certificate which the Inner agent presents to the client to verify its identity as part of the SSL protocol.

$C_{CP}$—A client to outer agent connection.

$C_{SP}$—An inner agent to outer agent connection.

$C_{CC}$—The control connection between Inner agent and outer agent.

$SSLSession_{CP}$—The SSL session established between the client and the outer agent on $C_{CP}$.

$SSLSession_{CS}$—The SSL session established between the client and the Inner agent and being proxied by the outer agent.

$SSLSession_{CC}$—The SSL session established between the Inner agent and the outer agent on $C_{CC}$.

Steps

Figure 10:
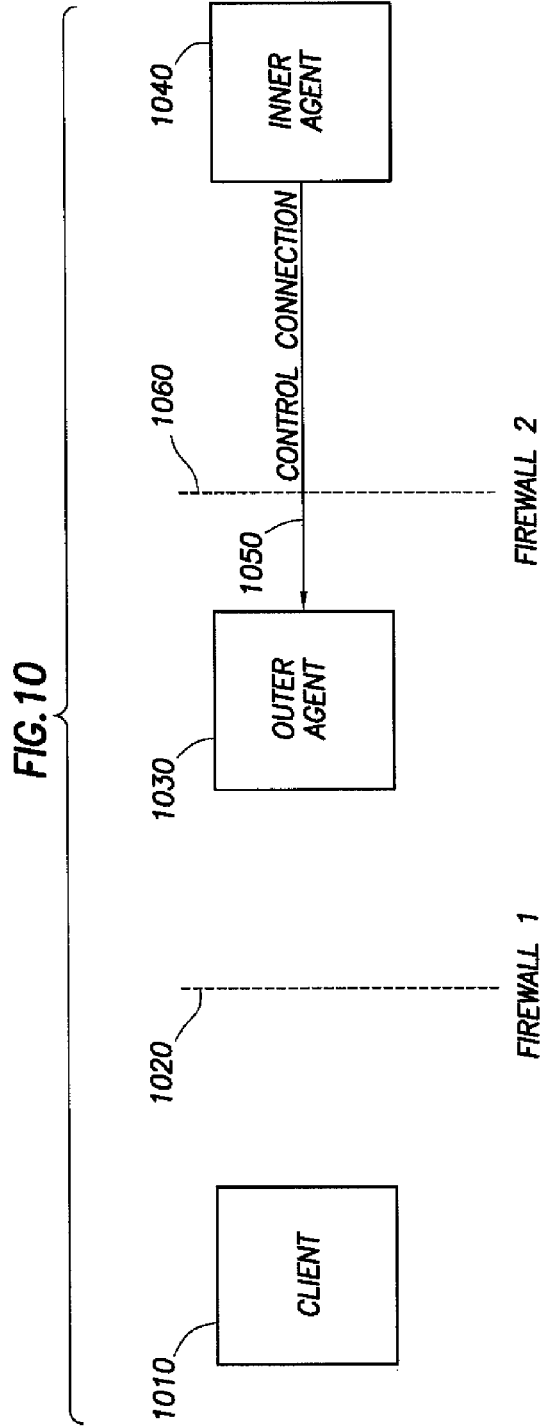
FIG. 10 is a block schematic view of another three component secure tunnel system, representing an embodiment of the invention.

Referring to FIG. 10, a client 1010 is separated by a first firewall 1020 from an outer agent 1030. An inner agent 1040 is coupled to the outer agent 1030 via a control connection 1050 that passes through a second firewall 1060.

The initial setup is shown in FIG. 10. The firewall on the client-side only allows connections to be initiated from the client, incoming connections to the client are blocked. The firewall on the inner agent-side only allows connections to be initiated from the inner agent, incoming connections to the inner agent are blocked. The client wishes to access services provided by the inner agent but because of the firewalls must go via the outer agent. The inner agent has a control connection established with the outer agent. It is the inner agent which initiates this control connection and the connection is used by the outer agent and the inner agent for exchanging information about the state of other connections.

The client can connect as follows.

The client makes a TCP connection to the outer agent.

The client negotiates SSL over this TCP connection. The client expects the certificate Outer AgentC to be presented as part of the SSL negotiation and closes the connection if this is not the case. The SSL session negotiated is $SSLSession_{CP}$. This connection is $C_{CP}$.

The outer agent requests the inner agent to create a new connection by sending a request down pre-existing $C_{CC}$.

The inner agent makes a new TCP connection to the outer agent and resumes SSL session $SSLSession_{CC}$ on that new connection. This new connection is $C_{SP}$.

The outer agent now proxies any data traffic received on $C_{CP}$ to $C_{SP}$. It decrypts/encrypts traffic received/sent on $C_{CP}$ using $SSLSession_{CP}$ and encrypts/decrypts traffic sent/received on $C_{SP}$ using $SSLSession_{CC}$.

The client negotiates SSL with inner agent using $C_{CP}$ which is proxied to the inner agent by the outer agent. The client expects the certificate Inner agentC to be presented by the inner agent as part of the SSL negotiation and closes the connection if that is not the case. The SSL session negotiated is $SSLSession_{CS}$.

The client and inner agent now have a secure tunnel via the outer agent along which they can pass arbitrary data. $SSLSession_{CP}$ and $SSLSession_{CC}$ are Outer SSL sessions and layered on top of them is $SSLSession_{CS}$ which is the Inner SSL session. To send data the client must first encrypt it using $SSLSession_{CS}$ then encrypt again with $SSLSession_{CP}$. To receive data the client must first decrypt it with $SSLSession_{CP}$ then decrypt again with $SSLSession_{CS}$. To send data the inner agent must first encrypt it with $SSLSession_{CS}$ then encrypt again with $SSLSession_{CC}$. To receive data the inner agent must first decrypt it with $SSLSession_{CC}$ then decrypt again with $SSLSession_{CS}$.

The client and inner agent authenticate via the secure tunnel they have created. This later-stage (e.g., last step of) authentication is flexible so that end users may customize it. The inner agent may do this authentication itself or it may delegate it. The inner agent must however be informed once the authentication is complete and whether or not it was successful.

If the authentication was unsuccessful the inner agent closes $C_{SP}$. When $C_{SP}$ is closed the outer agent closes $C_{CP}$.

If the authentication was successful the inner agent sends a message down $C_{CC}$ informing outer agent that the client using SSL session $SSLSession_{CS}$ and the SSL session id $SID_{CS}$ has successfully authenticated.

The inner agent now allows the client connection appropriate access to internal services.

The client has now has a fully authenticated connection.

Authentication for subsequent connections will now be described.

Once the initial connection has been successfully authenticated it may not be desirable to have to go through a full authentication for subsequent connections. Full authentication may require the user interaction such as typing in a username and password and we may not want to force the user to do this for each new connection.

There are at least two ways to avoid going through full authentication for subsequent connections.

A first way is through the use of SSL sessions. SSL session information allows two systems to create a new connection and resume a previously negotiated SSL session on that connection. It is impossible to successfully resume an SSL session without knowing the SSL session information and this information is known only to the two systems which negotiated the original SSL session. After the initial connection the client shares an SSL session ($SSLSession_{CP}$) with the outer agent. It shares another SSL session ($SSLSession_{CS}$) with the inner agent. These SSL sessions are only cached by the outer agent and the inner agent after the client has successfully authenticated. For subsequent connections after the original one the client can avoid full authentication by resuming these SSL sessions. Only the client and the outer agent know the $SSLSession_{CP}$ information so if the client successfully resumes this session this proves to the outer agent that this new connection is from the client who authenticated previously. Only the client and the inner agent know the $SSLSession_{CS}$ information so if the client successfully resumes this session this proves to the inner agent that this new connection is from the client that successfully authenticated previously. Once both SSL sessions are resumed the client is fully authenticated to both the outer agent and the inner agent. Basing subsequent authentication on the SSL session is not always desirable. It assumes the outer agent and the inner agent have a great deal of control over SSL session caching so that they can, cache sessions once authenticated; remove cached sessions to end a client's session; identify a client by the cached session. It may be difficult for the outer agent and inner agent to have this much control over the cached sessions, especially if they are running hardware based encryption or do any kind of connection load-balancing. This means a second way of authenticating subsequent connections without doing a full authentication is needed.

A second way relies on issuing a token to the client. The clients can be given a token which allows them to skip full authentication when making subsequent connections. The inner agent will accept this token as a suitable credential when authenticating a client for subsequent connections. To issue the token an additional 12th step is added to the above initial connection process, namely return a token to the client. Subsequent connections are the same as the above process for initial connections until step 8, where the token to authenticate. The client sends the token it obtained in the $12^{th}$ step above to the inner agent via the secure tunnel. The inner agent uses this to authenticate the client. The connection then continues as for the initial client connection description above. The token used for authentication by subsequent connections can be termed a reconnect token.

The reconnect token will now be described in more detail. The reconnect token is a token a client can use to re-authenticate with the inner agent without going through full authentication. This token is a secret created by the inner agent and known only to the inner agent and the client. It should be infeasible for any other entity to guess the token. The client should only disclose the token to the inner agent and the inner agent should only disclose the token to the client, they should never disclose the token to any other entity.

There are at least two possible types of token.

A first type of token is a random token. The token is a large random number generated by the inner agent and returned to the client on successful authentication. The inner agent notes the token along with the user id the client authenticated as. The token should be generated from a cryptographically secure random number source. The inner agent can invalidate a token by deleting its copy of it and therefore not accepting it any more.

A second type of token is a message authentication code token. The token includes a user id used by the client, a time-stamp, and a message authentication code (MAC). Only the inner agent knows the key used to generate the MAC so only it can generate and verify tokens. This approach means there is no need for the inner agent to store tokens, it need only store the key used to generate the MAC. However without noting the tokens it is harder for the inner agent to control token lifetimes. It can invalidate all tokens by changing the key and it can add a timestamp to the token so it can time it out but invalidating all tokens is not very flexible and adding timestamps leads to other issues.

The outer agent can also return a reconnect token to the client. This means the client can identify itself to the outer agent as having previously authenticated. The outer agent can then allow only connections that have been previously authenticated to the inner agent. There is a problem with this however.

First Connection Problem

With the authentication methods discussed above there is problem with the first connection. In order to authenticate the client must connect to the inner agent, but ideally only authenticated connections should be let through to the inner agent to stop malicious. clients from attacking the inner agent.

We could have the outer agent authenticate connections but it's difficult to give the outer agent direct access to the authentication database without exposing the database more directly and because authentication databases hold sensitive information they would typically be on the internal network behind the inner agent.

Also a solution in which the outer agent is passed credentials to authenticate can be open to abuse by the outer agent. The outer agent may be able to mis-represent itself to the inner agent as the client, and this is unacceptable if we wish to preserve the integrity of the secure connection between the client and the inner agent.

We can mitigate the problem of malicious clients performing a denial of service attack by limiting the resources an un-authenticated connection is allowed to consume. This doesn't solve the problem of malicious resource use completely. It doesn't stop a malicious client from performing attacks which exploit any flaws in the inner agent in order to break it or gain unauthorised access to it. However, some of these attacks (if they are at the transportation protocol level) will be stopped by the proxying of the outer agent.

A solution which allows the outer agent to authenticate connections before allowing them access to the inner agent but doesn't necessitate the outer agent needing access to sensitive information is discussed below.

Authenticating using Public Key Cryptography

Public key cryptography, and in particular client Certificates, offer unique advantages in conjunction with our model. The asymmetric nature of public key cryptography allows authentication schemes in which the authentication process relies only on public information. This means anyone can authenticate a client without having to possess private information which could be used to mis-represent themselves as that client to someone else. This property means that the outer agent can authenticate a client before passing any traffic originating from the client to the inner agent. This protects the inner agent from any malicious attacks from unauthenticated clients, connections from unauthenticated clients simply don't get past the outer agent.

The use of client certificates as part of the SSL protocol also guarantees that the outer agent cannot misuse the credentials given to it. It can't use them to mis-represent itself to the inner agent as the client. The integrity of the secure tunnel from the client to the inner agent is preserved.

Authentication using client certificates can be done either at the outer agent, or at both the outer agent and the inner agent.

Authentication at the outer agent provides an opportunity to stop clients which have no authorization at all. The outer agent will possess a list of certificate authorities with which to check client certificates. Any client presenting a certificate signed by one of the certificate authorities is allowed a connection through to the inner agent. The inner agent can apply a more rigorous authentication policy, for example enforcing constraints on the identity of the client, on the time of day the client is allowed to log in at, or the number of hours the client is allowed to connect for, as well as the services a client is allowed to access.

This rough first check allows through to the inner agent clients which are unlikely to act maliciously, but a stricter, more specific policy can still be enforced at the inner agent.

Authentication at the Outer Agent Only $Cert_{CA}$ is a public certificate for a certificate authority. $Key_{CA}$ is the matching private key. The inner agent and outer agent both have a copy of $Cert_{CA}$.

$Cert_C$ is a public certificate for the client. $Key_C$ is the matching private key.

$Cert_C$ has been signed by $Key_{CA}$ and $Cert_{CA}$ can be used to verify this signature.

The outer agent has a copy of $Cert_{CA}$.

The inner agent has an established control connection ($C_{CC}$) to the outer agent.

The initial connection from the client to the inner agent can be established as follows:

The client makes a TCP connection to the outer agent.

The client negotiates SSL over this TCP connection. The client expects the outer agent certificate (Outer AgentC) to be presented as part of the SSL/TLS negotiation and closes the connection if this is not the case. As part of this negotiation the client presents $Cert_C$ to the outer agent and sends an SSL Certificate verify message. The outer agent uses $Cert_{CA}$ to verify the client. If the outer agent fails to verify the client certificate then the connection from the client is dropped. If the outer agent successfully verifies the client certificate then the connection carries on as from 3 in the steps described above.

Authentication at the Outer Agent and the Inner Agent $Cert_{CA}$ is a public certificate for a certificate authority. $Key_{CA}$ is the matching private key. The inner agent and outer agent both have a copy of $Cert_{CA}$.

$Cert_C$ is a public certificate for the client. $Key_C$ is the matching private key.

$Cert_C$ has been signed by $Key_{CA}$ and $Cert_{CA}$ can be used to verify this signature.

The outer agent has a copy of $Cert_{CA}$.

The inner agent has a copy of $Cert_{CA}$.

The inner agent has an established control connection ($C_{CC}$) to the outer agent.

The initial connection from the client to the inner agent can be established as follows:

The client makes a TCP connection to the outer agent

The client negotiates SSL over this TCP connection. The client expects the outer agent certificate (Outer AgentC) to be presented as part of the SSL negotiation and closes the connection if this is not the case. As part of this negotiation the client presents $Cert_C$ to the outer agent and sends an SSL Certificate verify message. The outer agent uses $Cert_{CA}$ to verify the client. If the outer agent fails to verify the client certificate then the connection from the client is dropped. If the outer agent successfully verifies the client certificate then the connection carries on as below.

The SSL session negotiated is $SSLSession_{CP}$ and the SSL session id is $SID_{CP}$. This connection is $C_{CP}$.

The outer agent requests the inner agent to create a new connection by sending a request down $C_{CC}$.

The inner agent makes a new TCP connection to the outer agent and resumes SSL session $SSLSession_{CC}$ on that new connection. This new connection is $C_{SP}$.

The outer agent now proxies any data traffic received on $C_{CP}$ to $C_{SP}$. It decrypts/encrypts traffic received/sent on $C_{CP}$ using $SSLSession_{CP}$ and encrypts/decrypts traffic sent/received on $C_{SP}$ using $SSLSession_{CC}$.

The client negotiates SSL with the inner agent using $C_{CP}$ which is proxied to the inner agent by the outer agent. The client expects the Inner agent Certificate (Inner agentC) to be presented by the inner agent as part of the SSL negotiation and closes the connection if that is not the case. As part of this negotiation the client presents $Cert_C$ to the inner agent and sends an SSL Certificate verify message. If the inner agent fails to verify the client certificate then the connection from the client is dropped. The SSL session negotiated is $SSLSession_{CS}$ and the SSL session id is $SID_{CS}$.

The client and inner agent now have a secure tunnel via the outer agent along which they can pass arbitrary data. $SSLSession_{CP}$ and $SSLSession_{CC}$ are Outer SSL sessions and layered on top of them is $SSLSession_{CS}$ which is the Inner SSL session. To send data the client must first encrypt it using $SSLSession_{CS}$ then encrypt again with $SSLSession_{CP}$. To receive data the client must first decrypt it with $SSLSession_{CP}$ then decrypt again with $SSLSession_{CS}$. To send data the inner agent must first encrypt it with $SSLSession_{CS}$ then encrypt again with $SSLSession_{CC}$. To receive data the inner agent must first decrypt it with $SSLSession_{CC}$ then decrypt again with $SSLSession_{CS}$.

Timing-out cached credentials will now be described. With both the reconnection token and the resumption of an SSL session we may wish to stop honouring these credentials after a period of time. For example if the user is connected but there has been no user activity for a certain period the reconnect token or the cached SSL session can be deleted. This forces the user to fully authenticate next time they create a connection.

Layered authentication will now be described. Client certificate authentication and the standard authentication described previously are not mutually exclusive, both may be employed on the same system giving two layers of authentication. For example client certificates may be used at the outer agent to stop malicious clients getting access to the inner agent but the inner agent may expect the client to present a user name and password which it checks in an LDAP database and gives access to services based on that.

An alternative embodiment is to use TLS instead of SSL. TLS is very similar to SSL and the method above will work equally well with either protocol.

An alternative embodiment has a list of certificate authority certificates used by the inner agent and the outer agent instead of just a single certificate authority certificate ($Cert_{CA}$).

Another alternative embodiment has the certificate authority certificates installed only on the inner agent. When the inner agent creates the control connection to the outer agent it passes the list of certificates to it.

Another alternative embodiment is where the inner agent and the outer agent have a list of revoked client certificates, if the client presents a certificate which matches a revoked certificate then authentication fails, regardless of whether the certificate is valid otherwise.

Another alternative embodiment has the list of revoked certificates installed only on the inner agent. When the inner agent creates the control connection to the outer agent it passes the list of revoked certificates to it.

Another alternative embodiment has restrictions embedded into the fields of the client certificate. For example there may be restrictions on the IP address the client connects from or the time of day the client is allowed to connect. The outer agent can check these restrictions and only allow the client access to the inner agent if appropriate.

Another alternative embodiment has the inner agent automatically update the client certificates on the client. Client certificates usually have an expiry date, after this date the certificate can not be used for authentication. Once the certificate has expired the client needs a new certificate in order to authenticate. In order to simplify this process when a client connects and its certificate is near expiry the inner agent can automatically supply a new certificate. The inner agent only gives new certificates to authenticated clients. The inner agent will add the old certificate to the certificate revocation list.

The invention can include the use of an outer agent which can strictly filter and throttle unauthenticated connections while applying looser restrictions once connections are authenticated.

The invention can include the use of two layers of SSL giving authentication at both the outer agent and the inner agent so that a compromise of the outer agent reveals no confidential information to an attacker and does not lead directly to the inner agent being compromised.

Thus, the invention can include a secure tunnel communications system, comprising: an inner agent; an outer agent coupled to the inner agent; and a client coupled to the outer agent, characterized by establishing a first connection ($C_{IO}$) from an inner agent to an outer agent including making a first TCP connection from the inner agent to the outer agent, negotiating a first SSL/TLS session ($SSLSession_{IO}$) between the inner agent and the outer agent over the first TCP connection and applying the second SSL/TLS session ($SSLSession_{IO}$) between the inner agent and the outer agent over the first TCP connection; establishing a second connection ($C_{CO}$) from a client and the outer agent including making a second TCP connection from the client to the outer agent, negotiating a second SSL/TLS session ($SSLSession_{CO}$) between the client and the outer agent over the second TCP connection and applying the second SSL/TLS session ($SSLSession_{CO}$) between the client and the outer agent over the second TCP connection; and then negotiating a third SSL/TLS session ($SSLSession_{CI}$) between the client and the inner agent via both the first SSL/TLS session ($SSLSession_{IO}$) and the second SSL/TLS session ($SSLSession_{CO}$) and applying the third SSL/TLS session ($SSLSession_{CI}$) between the client and the inner agent layered over both the first SSL/TLS session ($SSLSession_{IO}$) and the second SSL/TLS session ($SSLSession_{CO}$) and wherein negotiating the second SSL/TLS session ($SSLSession_{CO}$) includes verifying at the outer agent that the client possesses a certificate signed with a certificate associated with the inner agent.

Negotiating the third SSL/TLS session ($SSLSession_{CI}$) can include authenticating at the inner agent. The certificate associated with the inner agent can be created by the inner agent and the inner agent can be the certificate authority for the certificate associated with the inner agent. Authenticating at the inner agent, performed while negotiating the third SSL/TLS session, can include utilizing a list of authorized users that is i) available to the inner agent and ii) is not a) stored by the outer agent or b) available to the outer agent.

Advantages

Embodiments of the invention, can be cost effective and advantageous for at least the following reasons. Embodiments of the invention improve quality and/or reduces costs compared to previous approaches.

An important advantage of the invention is that it can make use of SSL/TLS protocols and thus benefits from the security and privacy offered by them. However because of the rendezvous mechanism described above it is able to use only outbound connections thus avoiding the requirement that an inbound connection to the inner agent be opened in an organization's firewall.

Another important advantage of the invention is that it can make use of tunneling over a standard protocol to allow the connections to pass through firewalls and proxy servers. However by making use of https/ssl/tis as the standard protocol, rather then http, the invention avoids the security problems and the inefficiency of requiring two network connections.

Another important advantage of the invention is by using an SSL/TLS connection running on a standard port number to establish the rendezvous, the invention can ensure that packet inspecting firewalls will allow the outbound connections to pass. The layered third SSL/TLS connection ensures the security and integrity of tunneled data.

Another important advantage of the invention is that the layered SSL approach can become efficient, after it is initially established, when the outer sessions are dropped.

Another important advantage of the invention is that the outer agent can do authentication yet it doesn't need access to an authentication database.

Another important advantage of the invention is that the outer agent can throttle the connections to the inner agent and, therefore, denial of service attacks are mitigated.

Another important advantage of the invention is that, if the outer agent is compromised, only the denial of service attack protection is lost. The connections to the inner agent are still secure and the inner agent still authenticates connections.

Definitions

The term client is intended to mean a data or signal processing apparatus adapted to communicate with the outer agent and the inner agent, for example a user, an application, a computer or a network. The phrase outer agent is intended to mean a data or signal processing apparatus adapted to communicate with the client and the inner agent, for example a computer, another network or a proxy such as a proxy server, a proxy gateway, a reverse proxy or a proxy cache. The phrase inner agent is intended to mean a data or signal processing apparatus adapted to communicate with the client and the outer agent, for example a computer, a network or a server such as a server platform, an application server, an audio/video server, a chat server, a fax server, an FTP server, a groupware server, an IRC server, a list server, a mail server, a news server, a proxy server, a telnet server or a web server. The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating. The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a or an are employed for grammatical style and merely for convenience. The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily. associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

Conclusion

The described embodiments and examples are illustrative only and not intended to be limiting.

Although embodiments of the invention can be implemented as a separate tunneled connections, embodiments of the invention may be associated with other (non)tunneled connections and, therefore, can be integrated into the system(s) with which they are associated. All the disclosed embodiments of the invention disclosed herein can be made and used without undue experimentation in light of the disclosure. Although the best mode of the invention contemplated by the inventors is disclosed, embodiments of the invention is not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be combined in the disclosed configurations, but can be combined in any and all configurations.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1 "The SSL Protocol Version 3.0" Nov. 18, 1996; Alan O. Freier, Philip Karlton and Paul C. Kocher; Transport Layer Security Working Group.
2 "The TLS Protocol Version 1.0" January 1999; T. Dierks and C. Allen, Network Working Group.
3 "Providing Secure Access Through Network Firewalls" European Patent Application EP1 081 918 A2, Mar. 7, 2003, Stephen John Hinde, Lawrence Wilcock and Colin Low; Hewlett-Packard Company.
4 "GoToMyPC: Making Life Simpler for Remote and Mobile Workers" 1997-2004; Lisa Phifer, Citrix Systems Inc.

What is claimed is:

1. A secure tunnel communications method in a computer system, comprising: establishing a first connection from an inner agent to an outer agent including establishing a first TCP connection from the inner agent to the outer agent, creating a first SSL/TLS session between the inner agent and the outer agent over the first TCP connection, and
    applying the first SSL/TLS session between the inner agent and the outer agent over the first TCP connection;
    establishing a second connection from a client to the outer agent including:
    establishing a second TCP connection from the client to the outer agent,
    creating a second SSL/TLS session between the client and the outer agent over the second TCP connection and
    applying the second SSL/TLS session between the client and the outer agent over the second TCP Connection;
    creating a third SSL/TLS session between the client and the inner agent and
    applying the third SSL/TLS session between the client and the inner agent layered over both the first SSL/TLS session and the second SSL/TLS session wherein the outer agent is restricted from accessing the third SSL/TLS session.

2. The secure tunnel communications method of claim 1, further comprising caching the first SSL/TLS session as a set of state information on both the inner agent and the outer agent.

3. The secure tunnel communications method of claim 1, further comprising:
    sending a request from the outer agent to the inner agent via the first connection to establish a third connection from the inner agent to the outer agent;
    establishing the third connection from the inner agent to the outer agent; and
    resuming the first SSL/TLS session using a set of state information on the third connection.

4. The secure tunnel communications method of claim 1, further comprising:
    after applying the third SSL/TLS session ceasing to apply the first SSL/TLS session between the inner agent and the outer agent; and
    ceasing to apply the second SSL/TLS session between the client and the outer agent.

5. The secure tunnel communications method of claim 1, wherein creating the second SSL/TLS session includes:
    verifying, at the outer agents that the client possesses a certificate associated with the inner agent; and
    wherein creating the third SSL/TLS session includes:
    authenticating the third SSL/TLS session by the inner agent.

6. The secure tunnel communications method of claim 5, wherein the certificate associated with the inner agent has been created by the inner agent and the inner agent is the certificate authority for the certificate associated with the inner agent.

7. The secure tunnel communications method of claim 5, wherein authenticating the third SSL/TLS session by the inner agent, comprises utilizing a list of authorized users that is i) available to the inner agent and ii) is not a) stored by the outer agent or b) available to the outer agent.

8. The secure tunnel communications method of claim 1, wherein the client closes the second connection when the outer agent does not present an outer agent certificate as part of negotiating creating the second SSL/TLS session.

9. The secure tunnel communications method of claim 1, wherein the second connection from the client to the outer agent is through TCP port 443.

10. The secure tunnel communications method of claim 1, wherein the inner agent closes the first connection when the outer agent does not present an outer agent certificate as part of creating the first SSL/TLS session.

11. The secure tunnel communications method of claim 1, wherein the first connection from the inner agent to the outer agent is through TCP port 443.

12. The secure tunnel communications method of claim 1, wherein the client closes the second connection if the inner agent does not present an inner agent certificate (IAC) as part of negotiating the third SSL/TLS session.

13. A computer readable medium, comprising computer readable code, wherein the computer readable code is configured to be executed to implement a secure tunnel communications method; the method comprising:
    establishing a first connection from an inner agent to an outer agent including:
    establishing a first TCP connection from the inner agent to the outer agent,
    creating a first SSL/TLS session between the inner agent and the outer agent over the first TCP connection, and
    applying the first SSL/TLS session between the inner agent and the outer agent over the first TCP connection;
    establishing a second connection from a client to the outer agent including:
    establishing a second TCP connection from the client to the outer agent,
    creating a second SSL/TLS session between the client and the outer agent over the second TCP connection, and
    applying the second SSL/TLS session between the client and the outer agent over the second TCP connection;
    creating a third SSL/TLS session between the client and the inner agent; and
    applying the third SSL/TLS session between the client and the inner agent layered over both the first SSL/TLS session and the second SSL/TLS session wherein the outer agent is restricted from accessing the third SSL/TLS session.

14. A secure tunnel communications system, comprising:
    an inner agent;
    an outer agent coupled to the inner agent; and
    a client coupled to the outer agent, wherein the secured tunnel communications system is established by:
    establishing a first connection from an inner agent to an outer agent including:

establishing a first TCP connection from the inner agent to the outer agent, creating a first SSL/TLS session between the inner agent and the outer agent over the first TCP connection, and applying the first SSL/TLS session between the inner agent and the outer agent over the first TCP connection;

establishing a second connection ($C_{CO}$) from a client to the outer agent including:

establishing a second TCP connection from the client to the outer agent, creating a second SSL/TLS session between the client and the outer agent over the second TCP connection, and applying the second SSL/TLS session between the client and the outer agent over the second TCP Connection:

creating a third SSL/TLS session between the client and the inner agent; and applying the third SSL/TLS session between the client and the inner agent layered over both the first SSL/TLS session and the second SSL/TLS session wherein the outer agent is restricted from accessing the third SSL/TLS session.

15. The computer readable medium of claim 13, the method further comprising:

caching the first SSL/TLS session as a set of state information on the inner agent and the outer agent.

16. The computer readable medium of claim 13, the method further comprising:

sending a request from the outer agent to the inner agent via the first connection to establish a third connection from the inner agent to the outer agent;

establishing the third connection from the inner agent to the outer agent; and resuming the first SSL/TLS session using a set of state information on the third connection.

17. The computer readable medium of claim 13, the method further comprising:

after applying the third SSL/TLS session, ceasing to apply the first SSL/TLS session between the inner agent and the outer agent; and ceasing to apply the second SSL/TLS session between the client and the outer agent.

18. The secure tunnel communication system of claim 14, wherein the secured tunnel communications system is established by caching the first SSL/TLS session as a set of state information on both the inner agent and the outer agent.

19. The secure tunnel communication system of claim 14, wherein the secured tunnel communications system is established by:

sending a request from the outer agent to the inner agent via the first connection to establish a third connection from the inner agent to the outer agent;

establishing the third connection from the inner agent to the outer agent; and resuming the first SSL/TLS session using a set of state information on the third connection.

20. The secure tunnel communication system of claim 14, wherein the secured tunnel communications system is established by:

after applying the third SSL/TLS session, ceasing to apply the first SSL/TLS session between the inner agent and the outer agent; and ceasing to apply the second SSL/TLS session between the client and the outer agent.

* * * * *

UNITED STATES PATENT AND TRADEMARK OFFICE
CERTIFICATE OF CORRECTION

PATENT NO. : 7,565,526 B1
APPLICATION NO. : 11/050097
DATED : July 21, 2009
INVENTOR(S) : Shaw et al.

Page 1 of 1

It is certified that error appears in the above-identified patent and that said Letters Patent is hereby corrected as shown below:

In Claim 5, Column 25 (line 66), please replace "agents" with --agent,--;

In Claim 8, Column 26 (line 17), please delete "negotiating".

Signed and Sealed this

Twenty-second Day of September, 2009

David J. Kappos
*Director of the United States Patent and Trademark Office*